United States Patent [19]
Miura et al.

[11] Patent Number: 5,185,021
[45] Date of Patent: Feb. 9, 1993

[54] METHOD OF MANUFACTURING PREFORM FOR NONOXIDE GLASS FIBER

[75] Inventors: Kiyotaka Miura, Asa; Toshiharu Yamashita, Hachioji, both of Japan

[73] Assignee: Hoya Corporation, Tokyo, Japan

[21] Appl. No.: 587,946

[22] Filed: Sep. 24, 1990

[30] Foreign Application Priority Data

Sep. 29, 1989 [JP] Japan .................................. 1-254846

[51] Int. Cl.⁵ .......................................... C03B 37/023
[52] U.S. Cl. .................................. 65/3.11; 65/2; 65/3.2; 65/60.5; 65/102; 65/DIG. 16
[58] Field of Search ................. 65/183, 3.11, 102–122, 65/DIG. 16, 3.2, 60.5, 60.7

[56] References Cited

U.S. PATENT DOCUMENTS

| | | |
|---|---|---|
| 2,992,956 | 7/1961 | Bazinet ................................ 65/3.11 |
| 3,726,656 | 4/1973 | Reid et al. ............................ 65/3.13 |
| 3,963,468 | 6/1976 | Jaeger ................................... 65/3.11 |
| 3,980,461 | 9/1976 | Moeckel ................................. 65/9.2 |
| 4,063,914 | 12/1977 | Roeder et al. ............................. 65/2 |
| 4,098,596 | 7/1978 | Wu ..................................... 65/136 |
| 4,181,403 | 1/1980 | Macedo ................................ 65/3.11 |
| 4,253,731 | 3/1981 | Anderson et al. ................. 350/96.34 |
| 4,326,869 | 4/1982 | Karosaki ............................. 65/3.14 |
| 4,885,020 | 12/1989 | Nishino ..................................... 65/2 |
| 4,898,603 | 2/1990 | Hutta ................................... 65/3.13 |

FOREIGN PATENT DOCUMENTS 1194386  6/1970  United Kingdom .

*Primary Examiner*—Robert L. Lindsay
*Attorney, Agent, or Firm*—Nixon & Vanderhye

[57] ABSTRACT

In a method of manufacturing a preform for a nonoxide glass fiber, cladding and core glass materials are placed in a cylinder of an extrusion apparatus such that ground end faces of the respective cladding and core glass materials are in contact with each other and such that the cladding glass material is located adjacent a molding section of the extrusion apparatus. The cladding and core glass materials are heated within inert-gas atmosphere, to their respective temperatures equal to or below their respective sag points and equal to or above their respective crystallization start temperatures. An extrusion punch of the extrusion apparatus is pushed within the atmosphere, to extrude the cladding and core glass materials through a molding nozzle in the molding section while the cladding and core glass materials are in fusible contact with each other, thereby forming the preform of a core and cladding structure. The preform is gradually cooled within a liner connected to the molding section within the atmosphere. Alternatively, an over-cladding glass material may be placed in the cylinder such that the over-cladding material is located adjacent the molding section, and the cladding glass material is located between the over-cladding and core glass materials.

29 Claims, 2 Drawing Sheets

METHOD OF MANUFACTURING PREFORM FOR NONOXIDE GLASS FIBER

BACKGROUND OF THE INVENTION

The present invention relates to a method of manufacturing a preform for a nonoxide glass fiber and, more particularly, to a method of manufacturing a preform suitable for fabricating a nonoxide fiber such as halide glass material, chalcogenide glass material or the likk which are used in a long-distance optical-communication glass fiber, an infrared temperature measuring fiber, a laser-energy transmitting fiber or the like.

A nonoxide glass fiber is wide in a light transmitting window as compared with an optical fiber which is composed of an oxide glass material including a quartz glass material. Since, particularly, a light within an infrared range is well transmitted through the nonoxide glass fiber, it the has been expected that the nonoxide glass fiber is applied to various fields such as optical communication, temperature measurement, energy transmission, or the like. However, the nonoxide glass material is strong in crystallization tendency as compared with the oxide glass material, and the glass surface of the nonoxide glass material is active with respect to atmospheric oxygen and water. Further, since the nonoxide glass material is composed of multi-components which are largely different in vapor pressure from each other, attention must be paid to manufacturing and fiberization of a preform for an optical fiber having a core-cladding structure.

A built-in casting method, a rotational casting method and a double crucible method are known as a method of manufacturing the preform for the optical fiber made of the nonoxide glass material.

In the case of the built-in casting method, a molten cladding glass liquid is first poured into a casting mold so as to become full. By doing so, the molten glass liquid initiates solidification from its periphery. Before the solidification reaches the entirety, the casting mold is inverted or turned to put out or discharge the glass liquid at the central section of the casting mold. Subsequently, a core glass liquid is poured into the central section of the casting mold, and the entire core glass liquid is solidfied. Thus, there is produced the preform. In this connection, reference should be made to Japanese Patent Provisional Publication No. SHO 63-143508.

In the case of the rotational casting method, a small quantity of a cladding glass liquid is poured into a casting mold. The casting mold is rotated. A centrifugal force induced by the rotation causes the glass liquid to adhere to the inner wall surface of the casting mold. In this manner, the glass liquid is solidified, and a solidified glass material is formed along the inner wall surface of the casting mold. Subsequently, a core glass liquid is fully poured into the solidified glass material, and is solidified. Thus, there is produced a preform. In this connection, reference should be made to Japanese Patent Publication No. SHO 61-21174.

In the case of the double crucible method, so-called double crucibles are used in which a core glass liquid is poured into an internal crucible, and a cladding glass liquid is poured into an external crucible. These molten liquids pass continuously through their respective nozzles. Thus, there is produced a preform. In this connection, reference should be made to Japanese Patent Provisional Publication No. SHO 63-190741.

However, the above-described methods have the following various problems. That is, since both the cladding glass material and the core glass material are cast into the mold under the condition that the glass materials are low in viscosity, that is, are molten, bubbles and striae tend to be mixed into the glass materials. Furthermore, since the core glass liquid is further cast onto the cladding glass material under the condition of beginning to be solidified, the cladding glass material is again heated. Thus, since the cladding glass material is lengthened in remaining time within a range of crystal deposition or precipitation temperature, the cladding glass material tends to be crystallized. Moreover, a halide glass material and a chalcogenide glass material have the following various problems. That is, since the halide glass material and the chalcogenide glass material are sudden or abrupt in change in viscosity with respect to temperature change, in a casting temperature range, as compared with the oxide glass material, the halide glass material and the chalcogenide glass material are narrow in a working temperature range. Thus, the conventional methods have a disadvantage that they are difficult in manufacturing of an elongated preform and control of a cladding thickness and core diameter.

As a method of manufacturing a preform, which can solve the above-discussed problems, it has been considered to utilize an extrusion method, as disclosed in Japanese Patent Provisional Publication No. SHO 51-64517 which corresponds to U.S. Pat. No. 4,063,914. In the method disclosed in the publication, however, an enclosing glass material must beforehand be processed into a tubular configuration, and a rod-like or bar-like element of a core glass material must concentrically be arranged within the enclosing glass material. It is technically difficult to form a bore in the glass material. Particularly, since the halide glass material and the chalcogenide glass material are large in thermal expansion coefficient, there are such a disadvantage or problem that the glass material is broken during processing. Furthermore, it is difficult for the method that the cladding glass material and the core glass material are completely in close contact with each other.

SUMMARY OF THE INVENTION

It is therefore an object of the invention to provide a method of manufacturing a preform of a nonoxide glass material such as a halide glass material, chalcogenide glass material or the like, in which bubbles, striae, crystals do not exist in the preform, in which it is possible to produce the elongated preform, in which control of a cladding thickness and a core diameter is easy, in which there is no necessity to conduct complicated processing to a glass material before manufacturing the preform, and in which close contact at an interface is easy.

According to the invention, there is provided a method of manufacturing a preform for a nonoxide glass fiber, comprising the steps of:

preparing an extrusion apparatus comprising a cylinder, a molding section mounted to a forward end of the cylinder, the molding section being formed therein with a molding nozzle, an extrusion punch inserted in the cylinder for sliding movement, and a liner connected to the molding nozzle in the molding section;

preparing a cladding glass material which has both end faces extending substantially in parallel relation to each other, at least one of the end faces being ground;

preparing a core glass material which has both end faces extending substantially in parallel relation to each other, at least one of the end faces of the core glass material being ground;

placing the cladding glass material and the core glass material in the cylinder of the extrusion apparatus such that the ground end face of the cladding glass material and the ground end face of the core glass material are in contact with each other and such that the cladding glass material is located adjacent the molding section of the extrusion apparatus;

heating the cladding glass material and the core glass material to their respective temperatures at least equal to their respective sag points and at most equal to their respective crystallization start temperatures;

pushing the extrusion punch to extrude the cladding glass material and the core glass material through the molding nozzle in the molding section while the cladding glass material and the core glass material are in fusible contact with each other, thereby forming the preform of a core and cladding structure; and gradually cooling the preform within the liner connected to the molding section.

According to the invention, there is also provided a method of manufacturing a preform for a nonoxide glass fiber, comprising the steps of:

preparing an extrusion apparatus comprising a cylinder, a molding section mounted to a forward end of the cylinder, the molding section being formed therein with a molding nozzle, an extrusion punch inserted in the cylinder for sliding movement, and a liner connected to the molding nozzle in the molding section;

preparing a cladding glass material which has both end faces extending substantially in parallel relation to each other, both of the end faces being ground;

preparing a core glass material which has both end faces extending substantially in parallel relation to each other, at least one of the end faces of the core glass material being ground;

preparing an over-cladding glass material which has both end faces extending substantially in parallel relation to each other, at least one of the end faces of the over-cladding glass material being ground;

placing the over-cladding glass material, the cladding glass material and the core glass material in the cylinder of the extrusion apparatus such that the ground end face of the over-cladding glass material, both the ground end faces of the cladding glass material and the ground end face of the core glass material are in contact with each other and such that the over-cladding glass material is located adjacent the molding section of the extrusion apparatus, the core glass material is located adjacent the extrusion punch of the extrusion apparatus, and the cladding glass material is located between the over-cladding glass material and the core glass material;

heating the over-cladding glass material, the cladding glass material and the core glass material to their respective temperatures at least equal to their respective sag points and at most equal to their respective crystallization start temperatures;

pushing the extrusion punch to extrude the over-cladding glass material, the cladding glass material and the core glass material through the molding nozzle in the molding section while the over-cladding glass material, the cladding glass material and the core glass material are in fusible contact with each other, thereby forming the preform of a concentric three-layer structure; and gradually cooling the preform within the liner connected to the molding section.

With the arrangement of the invention, it is sufficient only that the respective contact surfaces of the cladding glass material and the core glass material are ground. Accordingly, the preparation step of the glass materials for extrusion is easy. Further, since gaps between and cuts or scratches in the contact surfaces of the respective cladding and core glass materials are removed by the grinding, bubbles and striae are not mixed in the preform. Furthermore, since the glass materials are extruded in the high viscosity range equal to or above their respective glass sag points and equal to or below their respective crystallization start temperatures, crystals, cracks and striae are not generated in the produced preform. Accordingly, even in the case of the nonoxide glass material in which the working temperature range is narrow, it is possible to manufacture the preform for an optical fiber, which is less in loss.

Further, by change or variation in the thickness or quantity of the cladding glass material and the core glass material, it is possible to easily alter the ratio between the cladding and the core of the preform, that is, between the cladding diameter and the core diameter of the preform, and the length of the preform.

Furthermore, not only the preform of a double-layer structure including the cladding and the core, but also the preform of a three-layer structure including the over-cladding, the cladding and the core can easily be manufactured.

DESCRIPTION OF THE EMBODIMENTS

Figure 1:
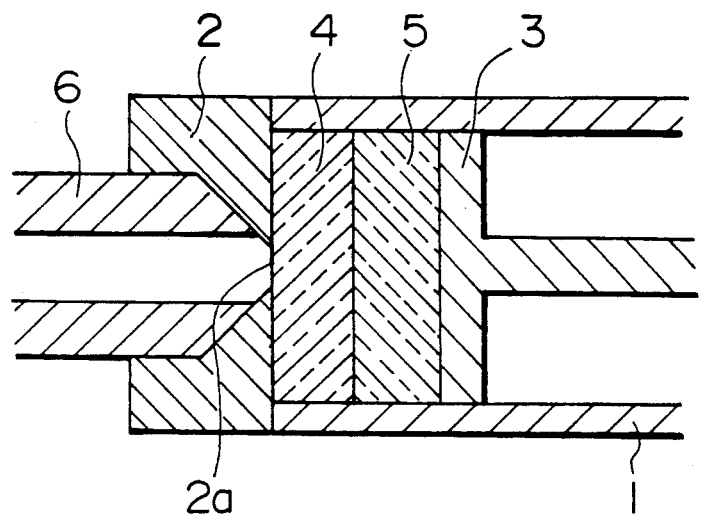
FIG. 1 is a longitudinal cross-sectional view showing an extrusion apparatus for a preform under condition that a cladding glass material and a core glass material are set.
Figure 2:
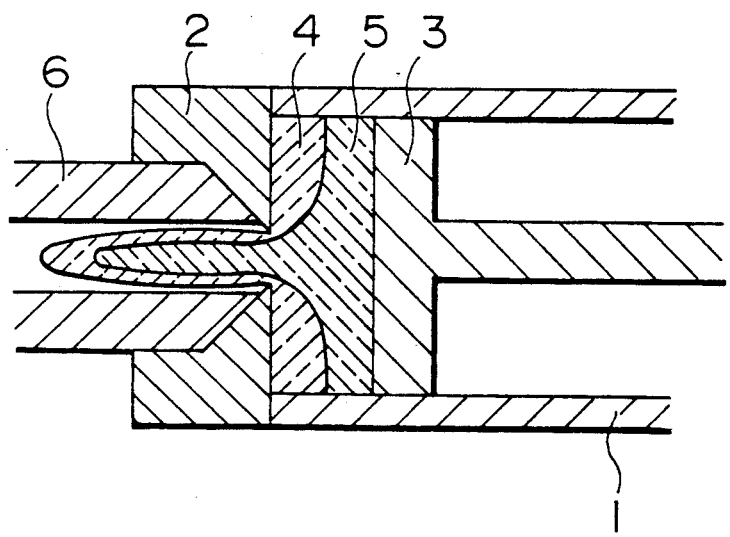
FIG. 2 is a longitudinal cross-sectional view showing the preform under molded.

Referring first to FIGS. 1 and 2, there is shown, in longitudinal cross-sectional views, an extrusion apparatus which is used in a method of manufacturing a preform for a nonoxide glass fiber, according to the invention. In FIGS. 1 and 2, the extrusion apparatus comprises a cylinder 1 having its both open ends, and a molding section (die) 2 mounted to the forward end of the cylinder 1. The molding section 2 is formed therein with a molding nozzle 2a which communicates with the interior of the cylinder 1. The extrusion apparatus further comprises an extrusion punch 3 generally in the form of a piston, which is inserted in the cylinder 1 for sliding movement. A cladding glass material 4 and a core glass material 5 are arranged in a space defined within the cylinder 1 at a location between the molding section 2 and the extrusion punch 3. The cladding glass material 4 forms a cladding when the cladding and core glass materials 4 and 5 are formed into an optical-fiber preform or an optical fiber. The core glass material forms a core when the cladding and core glass materials 4 and 5 are formed into the optical-fiber preform or the optical fiber. A tubular liner 6 is connected to the molding section 2, for guiding and gradually cooling the molded preform. Further, a heating device (not shown)

for heating the glass materials 4 and 5 within the cylinder 1 and the molding section 2 is arranged on the outside or inside of each of the cylinder 1 and the molding section 2.

Each of the cladding glass material 4 and the core glass material 5 is a nonoxide glass material, and has a pair of end faces which extend in parallel relation to each other. Each of the cladding glass material 4 and the core glass material 5 is processed into a configuration substantially identical with the cross-sectional surface of the extrusion punch 3, and at least one of the pair of substantially parallel end faces is ground. The cladding glass material 4 and the core glass material 5 are placed within the cylinder 1 such that the ground end face of the cladding glass material 4 and the ground end face of the core glass material 5 are in contact with each other and that the cladding glass material 4 is located adjacent the molding section 2. At this time, it is preferable that the cladding glass material 4 and the core glass material 5 are in optical contact with each other, that gaps are completely removed from the interface between the cladding glass material 4 and the core glass material 5, and that cuts or scratches are completely removed from the glass surfaces of the respective cladding glass material 4 and core glass material 5. The reason for this is that, in the case where the extrusion molding is practiced under the condition that the gaps and the cuts or scratches exist, the gaps and the cuts or scratches remain as bubbles at the interface between the core and the cladding, so that, in the case of being fiberized, the bubbles cause scattering.

Furthermore, the above-described term "substantially parallel faces" should be faces in which the core and cladding glass materials having their respective faces extending substantially in parallel relation to each other are used to manufacture a preform, the preform is fiberized to produce an optical fiber, and a degree of eccentricity of the core of the optical fiber with respect to the cladding has a parallelism which is of the order of being within a usable range.

Further, the cladding glass material 4 and the core glass material 5 should not largely be different in thermal expansion coefficient and viscosity at the molding temperature. If the thermal expansion coefficient is largely different between the cladding and core glass materials 4 and 5, cracks will be formed in the preform during cooling. On the other hand, if the viscosity is largely different between the cladding and core glass materials 4 and 5, a preform having the core and the cladding will not be produced.

A preferable difference in thermal expansion coefficient between the cladding and core glass materials 4 and 5 during molding is equal to or less than $10 \times 10^{-7}/°C.$, and a preferable difference in viscosity between the cladding and core glass materials 4 and 5 is equal or less than 10 poises. Particularly preferably, it is better that the thermal expansion coefficient of the cladding glass material 4 is equal to or slightly less than that of the core glass material 5, and the viscosity of the cladding glass material 4 is equal to or slightly higher than the core glass material 5.

Molding of the cladding and core glass materials 4 and 5 is practiced as follows. That is, the cladding and core glass materials 4 and 5 are heated to temperature equal to or higher than the sag points of the respective glass materials 4 and 5 and equal to or less than the crystallization start temperatures of the respective glass materials 4 and 5. An urging force is applied to the extrusion punch 3 to extrude the cladding and core glass materials 4 and 5 through the molding nozzle 2a in the molding section 2. In this connection, reference should be made to FIG. 2. If pressure is applied to the glass materials 4 and 5 at temperature lower than their respective sag points, the glass materials 4 and 5 will not be extruded, but cracks will be formed in the glass materials. Further, if the glass materials 4 and 5 reach their temperature higher than their respective crystallization start temperatures, the glass materials 4 and 5 are crystallized. Application of pressure to the glass materials 4 and 5 under this condition is not preferable, because crystals are precipitated in the preform.

Each of the sag points can be obtained by thermal analysis on the basis of Japan Optical Glass Industrial Society, JOJIS-1975, and has its viscosity of the order of $10^{11}$ poises. The crystallization start temperature should be one at which crystals are not precipitated when a preform for an optical fiber is manufactured. It is possible, however, to beforehand measure the crystallization start temperature by thermal analysis or the like.

It is desirable that a particularly preferable temperature range is that the cladding and core glass materials 4 and 5 have their viscosities within a range of from $10^9$ to $10^6$ poises. If the viscosity is equal to or less than $10^6$ poises, the temperature range is substantially equal to or less than the crystallization start temperature.

As shown in FIG. 2, the extrusion punch 3 is moved toward the molding section 2 to extrude the cladding glass material 4 and the core glass material 5 through the molding nozzle 2a in the molding section 2 while the cladding and core glass materials 4 and 5 are in fusible contact with each other. By doing so, the cladding and core glass materials 4 and 5 enter the liner 6 while forming a preform, and are gradually cooled.

In the case of the above-described extrusion apparatus, change in dimension or size of the molding nozzle 2a in the molding section 2 enables a preform having a desirable diameter to easily be produced. Further, adjustment of the quantities of the respective glass materials 4 and 5 before molding enables the cladding thickness, the core diameter and the length of the preform to easily be adjusted.

For example, in the case where it is desired to produce a preform having a thin cladding, the quantity of the cladding glass material should decrease, that is, the distance between the substantially parallel faces should be shortened, and the quantity of the core glass material should increase, that is, the distance between the substantially parallel faces should be lengthened. Furthermore, adjustment in viscosity within a temperature range at molding of the core and cladding glass materials also enables the quantities of the respective cladding and core glass materials to be changed or altered.

Further, the molding of the preform for the optical fiber is preferably done within the atmosphere of the inert gas such as Ar, He, $N_2$ or the like. The reasons why the inert gas atmosphere is preferable are that the preform does not react with moisture and oxygen so that the precipitation of crystals can be prevented, that, in the case where the inner wall of the extrusion punch is made of metal or carbon, the glass material is prevented from adhering to the inner wall of the extrusion punch so that crystals are not precipitated from the adhering surface, and that impurities in the inner wall of the extrusion punch are not taken into the glass material. In this case, a dried gas is especially preferable.

Further, as the atmosphere in which the molding of the preform for the optical fiber is conducted, there can be used an atmosphere other than the above-mentioned insert gas atmosphere as long as it is a relatively dried atmosphere in which the glass does not react with oxygen. For example, the molding of the preform can be conducted in a dried air.

Figure 3:
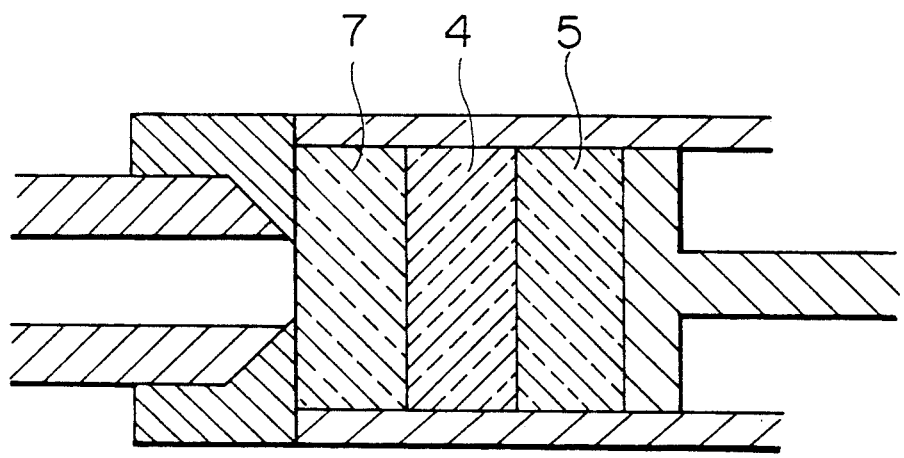
FIG. 3 is a longitudinal cross-sectional view showing the condition that the cladding glass material, the core glass material and an over-cladding glass material are set.

Apart from the above, as shown in FIG. 3, an optical-fiber preform of a three-layer structure can be produced, if an over-cladding glass material 7 is arranged on the left-hand side of the cladding glass material 4, that is, at a location between the cladding glass material 4 and the molding section 2. At this time, the substantially planar faces of the cladding glass material 4 are both ground, and are in contact with the ground faces of the respective over-cladding glass material 7 and core glass material 5. If oxide particularly high in crystallization and superior in chemical durability is used as the over-cladding glass material 7, it is unnecessary to conduct atmosphere control when the produced preform is fiberized. Thus, the crystallization of the core and cladding materials is restricted, so that it is possible to further raise the strength of the fiber.

EXAMPLES

The invention will next be described with reference to various examples. However, the invention should not be limited to these examples.

EXAMPLE 1

As fluoride raw materials were used $AlF_3$, $ZrF_4$, $YF_3$, $MgF_2$, $CaF_2$, $SrF_2$, $BaF_2$ and $NaF$. 75 g of a batch of a cladding glass material was prepared by weighing and mixing these fluorides in such proportions that, in term of mol %, $AlF_3$ was 30%, $ZrF_4$ was 10%, $YF_3$ was 6%, $MgF_2$ was 4%, $CaF_2$ was 20%, $SrF_2$ was 13%, $BaF_2$ was 8% and $NaF$ was 9%. 75 g of a batch of a core glass material was prepared by weighing and mixing these fluorides in such proportions that, in term of mol %, $AlF_3$ was 25%, $ZrF_4$ was 13%, $YF_3$ was 11%, $MgF_2$ was 4%, $CaF_2$ was 15%, $SrF_2$ was 14%, $BaF_2$ was 12% and $NaF$ was 6%. The above cladding and core glass materials were poured into a crucible made of carbon, and were heated and melted at 900° C. for two (2) hours within argon-gas (Ar) atmosphere. Subsequently, the melted glass liquid was rapidly cooled to 370° C., and was gradually cooled as it was till the room temperature. Thus, there were produced the disc-like cladding glass material 4 and the disc-like core glass material 5, which had their respective substantially parallel faces and which had their diameter of 35 mm and their length of 15 mm.

The cladding glass material 4 had its thermal expansion coefficient of $177 \times 10^{-7}$/°C., and the core glass material 5 had its thermal expansion coefficient of $179 \times 10^{-7}$/°C.

Subsequently, one side or end face of the cladding glass material 4 and one side or end face of the core glass material 5 were ground with surface accuracy equal to or above $\lambda/2$. Subsequently, the two glass materials 4 and 5 were in optical contact with each other within a clean booth whose cleanliness degree was 100. The glass materials 4 and 5 were placed within the cylinder 1 of the extrusion apparatus illustrated in FIG. 1 such that the cladding glass material 4 was located adjacent the molding section 2 having, at its center, the molding nozzle 2a whose diameter was 7 mm. The glass materials 4 and 5 were heated till temperature of 415° C. at which the viscosity of the cladding glass material 4 was brought to $10^9$ poises, and the viscosity of the core glass material 5 was brought to $4 \times 10^8$ poises. Pressure of 50 bar was applied to the extrusion punch 3. The extrusion punch 3 was moved toward the molding section 2. Pressure was applied to the cladding glass material 4 and the core glass material 5. Thus, a rod-like glass material of a double-layer structure was extruded through the molding nozzle 2a in the molding section 2, which had its diameter of 7 mm, along the liner 6. In this manner, a preform was produced whose diameter or cladding diameter was 7.3 mm, whose core diameter was 5.8 mm, and whose length was 500 mm. This preform was cut into round slices at intervals of 10 mm. Subsequently, an interface between the core and the cladding was observed by an optical microscope. As a result, no foreign matters such as crystals, bubbles or the like were found. The interface was irradiated with a He-Ne laser light. However, an interfacial scattering light was not observed with naked eye.

EXAMPLE 2

Fluoride raw materials identical with those of the above Example 1 was used, and they were weighed and mixed in the identical proportions. Subsequently, the cladding glass material 4 and the core glass material 5 were manufactured whose diameter was 35 mm, whose length was 15 mm and which had their respective substantially parallel end faces, by the same method as the Example 1. Further, a disc-like fluorophosphate glass material, i.e., an over-cladding glass material 7 was manufactured whose diameter was 35 mm, whose length was 15 mm, which had their respective substantially parallel faces. The over-cladding material consisted of $Al(PO_3)_3$: 11%, $Ba(PO_3)_2$: 1%, $AlF_3$: 11%, $MgF_2$: 9%, $CaF_2$: 16%, $SrF_2$: 16%, $BaF_2$: 10%, $LiF$: 10% and $NaF$: 16%, in term of mol %. The over-cladding glass 7 had its thermal expansion coefficient of $177 \times 10^{-7}$/°C. One side of the over-cladding glass material 7, one side of the core glass material 5 and both sides of the cladding glass material 4 were ground at surface accuracy equal to or higher than $\lambda/2$. Subsequently, as shown in FIG. 3, the ground end faces of the respective over-cladding, core and cladding glass materials 7, 5 and 4 were stuck together within the clean booth whose cleanliness degree was 100, and the three glass materials 4, 5 and 7 were in optical contact with each other. The glass materials 4, 5 and 7 were set within an extrusion apparatus identical with the Example 1 except that the molding nozzle 2a at the center of the molding section 2 was 9 mm, such that the over-cladding glass material 7 was located adjacent the molding section 2. Extrusion molding was practiced under the same condition as the Example 1. The viscosity of the over-cladding glass material 7 at that time was $4 \times 10^8$ poises. There was produced a preform of a three-layer structure whose diameter or over-cladding diameter was 9.4 mm, whose cladding diameter was 8.0 mm, whose core diameter was 6.3 mm, and whose length was 700 mm. This preform was cut into round slices at intervals of 10 mm. Subsequently, an interface between the over-cladding and the cladding and an interface between the core and the cladding were observed by an optical microscope. As a result, no foreign matters such as crystals, bubbles or the like were found. The interfaces were irradiated with a He-Ne laser light. However, an interfacial scattering light was not observed with naked eye.

EXAMPLE 3

As fluoride and chloride raw materials for a cladding glass material, there were used $AlF_3$, $ZrF_4$, $YF_3$, $MgF_2$, $CaF_2$, $SrF_2$, $BaF_2$, NaF and NaCl. 75 g of a batch of a cladding glass material was prepared by weighing and mixing these materials in such proportions that, in term of mol %, $AlF_3$ was 30%, $ZrF_4$ was 10%, $YF_3$ was 6%, $MgF_2$ was 4%, $CaF_2$ was 20%, $SrF_2$ was 13%, $BaF_2$ was 8%, NaF was 6% and NaCl was 3%. As fluoride and chloride raw materials for a core glass material, there were used $AlF_3$, $ZrF_4$, $YF_3$, $MgF_2$, $CaF_2$, $SrF_2$, $BaF_2$ and NaCl. 75 g of a batch of a core glass material was prepared by weighing and mixing these materials in such proportions that, in term of mol %, $AlF_3$ was 25%, $ZrF_4$ was 13%, $YF_3$ was 11%, $MgF_2$ was 4%, $CaF_2$ was 15%, $SrF_2$ was 14%, $BaF_2$ was 12% and NaCl was 6%. The above cladding and core glass materials were poured in a crucible made of carbon. By the same method as the Example 1, there were produced the disc-like cladding glass material 4 and the disc-like core glass material 5, which had their respective substantially parallel faces and which had their diameter of 35 mm and their length of 15 mm.

The cladding glass material 4 had its thermal expansion coefficient of $184 \times 10^{-7}/°C$., and the core glass material 5 had its thermal expansion coefficient of $183 \times 10^{-7}/°C$.

Subsequently, one side of the cladding glass material 4 and one side of the core glass material 5 were ground with surface accuracy equal to or above $\lambda/2$. Subsequently, the two glass ground faces were stuck together and were in optical contact with each other within a clean booth whose cleanliness degree was 100. The glass materials 4 and 5 were set within an extrusion apparatus identical with that of the Example 1, such that the cladding glass material 4 was located adjacent the molding section 2. The glass materials 4 and 5 were heated to temperature of 405° C. of the molding section 2, at which the viscosity of the cladding glass material 4 was brought to $6 \times 10^8$ poises, and the viscosity of the core glass material 5 was brought to $2.5 \times 10^8$ poises. Subsequently, pressure of 50 bar was applied to the glass materials by the extrusion punch 3, similarly to the Example 1. In this manner, a rod-like glass material of a double-layer structure was extruded through the molding section 2 having the molding nozzle 2a whose diameter was 7 mm, along the liner 6. Thus, a preform was produced whose diameter or cladding diameter was 7.2 mm, whose core diameter was 5.9 mm, and whose length was 500 mm. This preform was cut into round slices at intervals of 10 mm. Subsequently, an interface between the core and the cladding was observed by an optical microscope. As a result, no foreign matters such as crystals, bubbles or the like were found. The interface was irradiated with a He-Ne laser light. However, an interfacial scattering light was not observed with naked eye.

EXAMPLE 4

A high-purity (6N) element samples were weighed to a composition ratio of Si: 25%, As: 25% and Te: 50% in term of atomic % to obtain a cladding glass material. A high-purity (6N) element samples were weighed to a composition ratio of Si: 15%, Ge: 10%, As: 25% and Te: 50%, in term of atomic % to obtain a core glass material. Subsequently, each of the above cladding and core glass materials was placed in a high-purity quartz tube, and was vacuum-enclosed at pressure of the order of $1 \times 10^{-5}$ torr. These ampules were placed within a rocking furnace, and were stirred at 900° C. for twenty-four (24) hours. Subsequently, the ampules were cooled to 750° C. and, further, were maintained quietly for two (2) hours. These ampules were taken out or removed from the furnace, and were rapidly cooled to 220° C. The ampules were held for thirty (30) minutes. Subsequently, the ampules were gradually cooled to the room temperature. Thus, there were produced two kinds of disc-like chalcogenide glass materials each of which had its diameter of 30 mm and its length of 10 mm, and which had their respective substantially parallel end faces. The cladding glass material 4 had its thermal expansion coefficient of $13 \times 10^{-6}/°C$., and the core glass material 5 had its thermal expansion coefficient of $10 \times 10^{-6}/°C$. Subsequently, one side of the cladding glass material 4 and one side of the core glass material 5 were ground with surface accuracy equal to or above $\lambda/2$. Subsequently, the two glass ground faces were stuck together and were in optical contact with each other within a clean booth whose cleanliness degree was 100. The glass materials 4 and 5 were set within an extrusion apparatus identical with that of the Example 1, such that the cladding glass material 4 was located adjacent the molding section 2. The glass materials 4 and 5 were heated until temperature of the molding section 2 is brought to 325° C. Subsequently, pressure of 40 bar was applied to the glass materials by the extrusion punch 3, similarly to the Example 1. In this manner, a rod-like glass material of a double-layer structure was extruded through the molding section 2 having the molding nozzle 2a whose diameter was 7 mm, along the liner 6. Thus, a preform was produced whose diameter or cladding diameter was 7.2 mm, whose core diameter was 5.8 mm, and whose length was 250 mm. This preform was cut into round slices at intervals of 10 mm. Subsequently, an interface between the core and the cladding was observed by a metal microscope. As a result, no foreign matter such as crystals, bubbles or the like were found.

EXAMPLE 5

Flouride raw materials identical with those in the Example 1 were used, and were weighed at the same proportions. Subsequently, manufactured in the same manner as the Example 1 were a cladding glass material 4 whose both sides extended substantially parallel to each other, whose diameter was 35 mm and whose thickness or length was 15 mm, and a core glass material 5 whose both sides extended substantially parallel to each other, whose diameter was 35 mm and whose thickness was 5 mm.

Subsequently, argon gas from liquefied argon was used as atmosphere, and the cladding glass material 4 and the core glass material 5 were placed within the extrusion molding apparatus illustrated in FIG. 1, similarly to the Example 1. The cladding glass material 4 and the core glass material 5 were heated to 410° C. at which the viscosity of the cladding glass material 4 was approximately $10^9$ poises, and the viscosity of the core glass material 5 was approximately $4 \times 10^8$ poises. Pressure of 55 bar was applied to the extrusion punch 3 to conduct the extrusion molding.

In this manner, a preform was produced whose diameter or cladding diameter was 7.2 mm, whose core diameter was 5.0 mm, and whose length was 410 mm. The preform was cut into round slices at intervals of 10 mm.

Subsequently, an interface between the core and the cladding was observed by an optical microscope. As a result, no foreign matter such as crystals, bubbles or the like were found. The interface was irradiated with a He-Ne laser light. However, an interfacial scattering light was not observed with naked eye.

EXAMPLE 6

Fluoride raw materials identical with those in the Example 1 were used, and were weighed at the same proportions. Subsequently, manufactured in the same manner as that of the Example 1 were a cladding glass material 4 whose both sides extended substantially parallel to each other, whose diameter was 35 mm and whose thickness was 15 mm, and a core glass material 5 whose both sides extended substantially parallel to each other, whose diameter was 35 mm and whose thickness was 15 mm. Subsequently, raw materials identical with those in the Example 2 were used, and were weighed at the same proportions. Subsequently, by a method similar to that of the Example 2, a disc-like fluorophosphate glass material or an over-cladding glass material 7 was manufactured whose both sides extended substantially parallel to each other, whose diameter was 35 mm and whose thickness was 15 mm.

Subsequently, argon gas from liquefied argon was used as atmosphere, and the cladding glass material 4, the core glass material 5 and the over-cladding glass material 7 were placed within the extrusion molding apparatus illustrated in FIG. 3, similarly to the Example 2. The cladding glass material 4, the core glass material 5 and the over-cladding glass material 7 were heated to 410° C. at which the viscosity of the over-cladding glass material 7 was approximately $4 \times 10^8$ poises). Pressure of 55 bar was applied to the extrusion punch 3 to conduct the extrusion molding.

In this manner, a preform of three-layer structure was produced whose diameter or over-cladding diameter was 9.4 mm, whose core diameter was 5.8 mm, and whose length was 710 mm. The preform was cut into round slices at intervals of 10 mm. Subsequently, an interface between the over-cladding and the cladding and an interface between the core and the cladding were observed by an optical microscope. As a result, no foreign matters such as crystals, bubbles or the like were found. The interface was irradiated with a He-Ne laser light. However, an interfacial scattering light was not observed with naked eye.

EXAMPLE 7

Fluoride raw materials identical with those in the Example 1 were used, and were weighed at the same proportions. Subsequently, manufactured in the same manner as that of the Example 1 were a cladding glass material 4 whose both sides extended substantially parallel to each other, whose diameter was 35 mm and whose thickness was 15 mm, and a core glass material 5 whose both sides extended substantially parallel to each other, whose diameter was 35 mm and whose thickness was 15 mm.

Subsequently, dried air from a gas cylinder was used as atmosphere, and the cladding glass material 4 and the core glass material 5 were placed within the extrusion molding apparatus illustrated in FIG. 1, similarly to the Example 5. The cladding glass material 4 and the core glass material 5 were heated to 410° C. at which the viscosity of the cladding glass material 4 was approximately $10^9$ poises, and the viscosity of the core glass material was approximately $4 \times 10^8$ poises). Pressure of 50 bar was applied to the extrusion punch 3 to conduct the extrusion molding.

In this manner, a preform was produced whose diameter or cladding diameter was 7.3 mm, whose core diameter was 5.8 mm, and whose length was 490 mm. The preform was cut into round slices at intervals of 10 mm. Subsequently, an interface between the core and the cladding was observed by an optical microscope. As a result, no foreign matters such as crystals, bubbles or the like were found. The interface was irradiated with a He-Ne laser light. However, an interfacial scattering light was not observed with naked eye.

EXAMPLE 8

Fluoride raw materials identical with those in the Example 1 were used, and were weighed at the same proportions. Subsequently, manufactured in the same manner as that of the Example 1 were a cladding glass material 4 whose both sides extended substantially parallel to each other, whose diameter was 35 mm and whose thickness was 15 mm, and a core glass material 5 whose both sides extended substantially parallel to each other, whose diameter was 35 mm and whose thickness was 15 mm. For producing an over-cladding material, raw materials identical with those in the Example 2 were used, and were weighed at the same proportions. Subsequently, by a method similar to that of the Example 2, a disc-like fluorophosphate glass material or an over-cladding glass material 7 was manufactured whose both sides extended substantially parallel to each other, whose diameter was 35 mm and whose thickness was 15 mm.

Subsequently, dried air from a gas cylinder was used as atmosphere, and the cladding glass material 4, the core glass material 5 and the over-cladding glass material 7 were placed within the extrusion molding apparatus illustrated in FIG. 3, similarly to the Example 2. The cladding glass material 4, the core glass material 5 and the over-cladding glass material 7 were heated to 410° C. at which the viscosity of the over-cladding glass material 7 was approximately $4 \times 10^8$ poises). Pressure of 50 bar was applied to the extrusion punch 3 to conduct the extrusion molding.

In this manner, a preform of three-layer structure was produced whose diameter or over-cladding diameter was 9.4 mm, whose core diameter was 6.0 mm, and whose length was 600 mm. The preform was cut into round slices at intervals of 10 mm. Subsequently, an interface between the over-cladding and the cladding and an interface between the core and the cladding were observed by an optical microscope. As a result, no foreign matters such as crystals, bubbles or the like were found. The interface was irradiated with a He—Ne laser light. However, an interfacial scattering light was not observed with naked eye.

What is claimed is:

1. A method of manufacturing a preform for a nonoxide glass fiber, comprising the steps of:
    preparing an extrusion apparatus comprising a cylinder, a molding section mounted to a forward end of said cylinder, said molding section having a molding nozzle, an extrusion punch inserted in said cylinder for sliding movement, and a liner connected to said molding nozzle in said molding section;
    preparing a cladding glass preform having end faces extending substantially in parallel relation to each other, and at least one of said end faces being polished to such an extent that it is in optical contact with a core glass preform;

preparing the core glass preform having end faces extending substantially in parallel relation to each other, and at least one of said end faces of said core glass material being polished to such an extent that it is in optical contact with the cladding glass preform;

placing said cladding glass preform and said core glass preform in said cylinder of said extrusion apparatus such that the polished end face of said cladding glass preform and the polished end face of said core glass material preform are in contact with each other and such that said cladding glass preform is located adjacent said molding section of said extrusion apparatus;

heating said cladding glass preform and said core glass preform to a temperature between a high sag temperature and a low crystalline start temperature of respective preforms;

pushing said extrusion punch to extrude said cladding glass preform and said core glass preform through said molding nozzle in said molding section while said cladding glass preform and said core glass preform are in fusible contact with each other, thereby forming said preform with a core and cladding structure; and cooling said preform gradually within said liner connected to said molding section.

2. The method according to claim 1, wherein each of said cladding glass preform and said core glass material preform which are to be placed within said cylinder of said extrusion apparatus, is in the form of a circular cylinder.

3. The method according to claim 1, wherein each of said cladding preform and said core glass material, which are to be placed within said cylinder of said extrusion apparatus, is in the form of a prism.

4. The method according to claim 1, wherein said liner of said extrusion apparatus is tubular in configuration.

5. The method according to claim 1, wherein, when said cladding glass preform and said core glass preform are placed in said cylinder of said extrusion apparatus, said cladding glass preform and said core glass preform are in optical contact with each other, and wherein gaps at an interface between and cuts and scratches in the end faces of the respective cladding and core glass preforms are removed.

6. The method according to claim 1, wherein a difference in thermal expansion coefficient between said cladding glass preform and said core glass preform is within $10 \times 10^{-7}/°C$. at molding.

7. The method according to claim 1, wherein a difference in viscosity between said cladding glass preform and said core glass preform is within 10 poises during extrusion.

8. The method according to claim 1, wherein, during extrusion, said cladding glass preform is at most equal in thermal expansion coefficient to that of said core glass preform.

9. The method according to claim 1, wherein, during extrusion, said cladding glass preform is at least equal in viscosity to that of said core glass preform.

10. The method according to claim 1, wherein, at said heating step, said cladding glass preform and said core glass preform have their respective viscosities within a range of from $10^9$ to $10^6$ poises.

11. The method according to claim 1, wherein the extrusion of the preform is conducted in an atmosphere of inert gas.

12. The method according to claim 1, wherein an atmosphere in which the extrusion of the preform is conducted is in a dried atmosphere.

13. A method of manufacturing a preform for a nonoxide glass fiber, comprising the steps of:

preparing an extrusion apparatus comprising a cylinder, a molding section mounted to a forward end of said cylinder, said molding section having a molding nozzle, an extrusion punch inserted in said cylinder for sliding movement, and a liner connected to said molding nozzle in said molding section;

preparing a cladding glass preform having end faces extending substantially in parallel relation to each other, and at least one of said end faces being polished to such an extent that it is in optical contact with a core glass preform;

preparing the core glass preform having end faces extending substantially in parallel relation to each other, and at least one of said end faces of said core glass material being polished to such an extent that it is in optical contact with a cladding glass preform;

preparing an over-cladding glass preform having end faces extending substantially in parallel relation to each other, at least one of said end faces of said over-cladding glass material being polished;

placing said over-cladding glass preform, said cladding glass preform and said core glass preform in said cylinder of said extrusion apparatus such that the polished end face of said over-cladding glass preform, both the polished end faces of said cladding glass preform and the polished end face of said core glass preform are in contact with each other and such that said over-cladding glass preform is located adjacent said molding section of said extrusion apparatus, said core glass preform is located adjacent said extrusion punch of said extrusion apparatus, and said cladding glass preform is located between said over-cladding glass preform and said core glass preform;

heating said over-cladding glass preform, said cladding glass preform, and said core glass preform to a temperature between a high sag temperature and a low crystalline start temperature of respective preforms;

pushing said extrusion punch to extrude said over-cladding glass preform, said cladding glass preform and said core glass preform through said molding nozzle in said molding section while said over-cladding glass preform, said cladding glass preform and said core glass preform are in fusible contact with each other, thereby forming said preform with a concentric three-layer structure; and cooling said preform gradually within said liner connected to said molding section.

14. The method according to claim 13, wherein each of said over-cladding glass preform, said cladding glass preform and said core glass material, which are to be placed within said cylinder of said extrusion apparatus, is in the form of a circular cylinder.

15. The method according to claim 13, wherein each of said over-cladding glass preform, said cladding material and said core glass preform, which are to be placed within said cylinder of said extrusion apparatus, is in the form of a prism.

16. The method according to claim 13, wherein said liner of said extrusion apparatus is tubular in configuration.

17. The method according to claim 13, wherein, when said cladding glass preform and said core glass preform are placed in said cylinder of said extrusion apparatus, said cladding glass preform and said core glass preform are in optical contact with each other, and wherein gaps at an interface between and cuts and scratches in the end faces of the respective cladding and core glass preforms are removed.

18. The method according to claim 13, wherein a difference in thermal expansion coefficient between said cladding glass preform and said core glass material is within $10 \times 10^{-7}/°C$. at molding.

19. The method according to claim 13, wherein a difference in viscosity between said cladding glass preform and said core glass material is within 10 poises durning extrusion.

20. The method according to claim 13, wherein, durning molding, said cladding glass preform is at most equal in thermal expansion coefficient to that of said core glass preform.

21. The method according to claim 13, wherein, said cladding glass preform is at least equal in viscosity to that of said core glass preform.

22. The method according to claim 13, wherein, at said heating step, said cladding glass preform and said core glass preform have their respective viscosities within a range of from $10^9$ to $10^6$ poises.

23. The method according to claim 13, wherein the extrusion of the preform is conducted in an atmosphere of inert gas.

24. The method according to claim 13, wherein an atmosphere in which the extrusion of the preform is conducted is in a dried atmosphere.

25. The method according to claim 13, wherein said over-cladding glass preform is an oxide.

26. The method according to claim 1, wherein said at least one of the end faces of said cladding glass preform and said at least one of the end faces of said core glass preform are polished to a surface accuracy at least equal to $\lambda/2$.

27. The method according to claim 13, wherein said at least one of the end faces of said cladding glass preform and said at least one of the end faces of said core glass material are polished to a surface accuracy at least equal to $\lambda/2$.

28. A method of manufacturing a nonoxide glass fiber, comprising the steps of:
providing at least first and second preforms, each of which has at least one polished face which is in optical contact with each other;
positioning the first preform adjacent the second preform so that the polished faces thereof are in contact with one another, and so that the polished faces provide a high quality optical interface between the first and second preforms;
heating the first and second preforms;
extruding the first and second preforms into an elongated tubular configuration; and
cooling the tubular configuration.

29. A method according to claim 28, wherein each of said first and second preforms has at least one face polished to a surface accuracy at least equal to $\lambda/2$.

* * * * *